United States Patent [19]

Drexler et al.

[11] 4,279,989

[45] Jul. 21, 1981

[54] GELATIN-EPOXY SHEET MATERIALS

[75] Inventors: Jerome Drexler, Los Altos Hills; Carl R. Betz, Los Altos, both of Calif.

[73] Assignee: Drexler Technology Corporation, Mountain View, Calif.

[21] Appl. No.: 98,830

[22] Filed: Nov. 30, 1979

Related U.S. Application Data

[63] Continuation-in-part of Ser. No. 951,359, Oct. 16, 1978, abandoned.

[51] Int. Cl.³ .............................................. G03C 1/78
[52] U.S. Cl. .................................... 430/531; 430/537; 430/539; 156/246; 428/413; 428/478.2
[58] Field of Search ....................... 430/531, 539, 537; 428/413, 478.2; 156/246

[56] References Cited

U.S. PATENT DOCUMENTS

| 3,969,283 | 7/1976 | Timmerman et al. | 430/531 |
| 4,072,639 | 2/1978 | Yamaguchi et al. | 430/531 |
| 4,120,724 | 10/1978 | Tatsuta et al. | 427/40 |

*Primary Examiner*—Jack P. Brammer

[57] ABSTRACT

Epoxy is reinforced by gelatin to form gelatin-epoxy sheets. Initially the gelatin is carried on a non-bonding substrate for support and receives the desired epoxy coating which bonds to the gelatin. Next the coating is cured and the substrate is peeled from the gelatin leaving a gelatin reinforced epoxy sheet stock material. The opposite side of the gelatin may be coated in the same manner.

5 Claims, 6 Drawing Figures

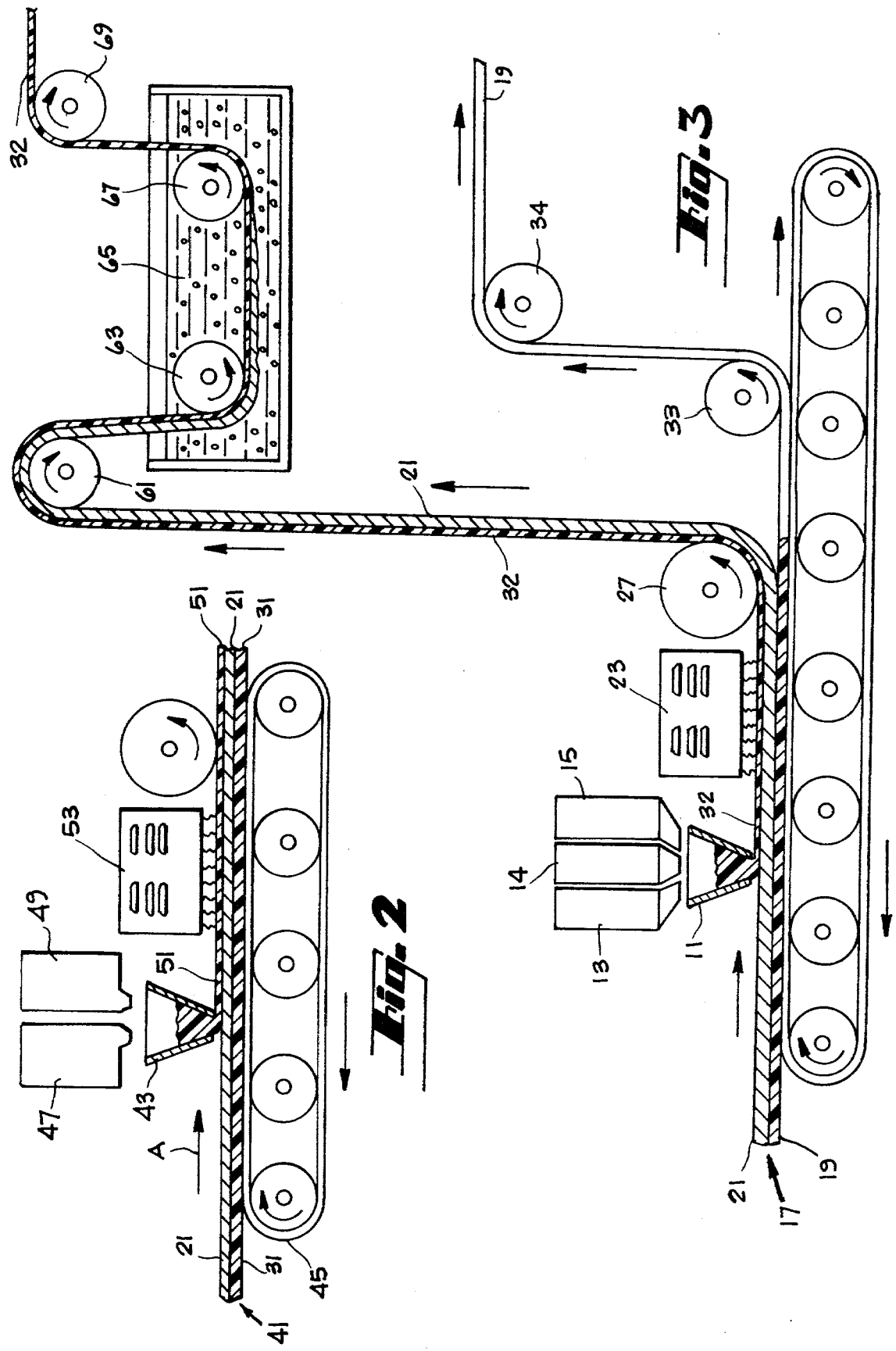

GELATIN-EPOXY SHEET MATERIALS

CROSS REFERENCE TO RELATED APPLICATION

This is a continuation-in-part of application Ser. No. 951,359, filed Oct. 16, 1978 by Jerome Drexler and Carl R. Betz, now abandoned.

BACKGROUND OF THE INVENTION a. Field of the Invention

The invention relates to the production of a thin stock sheet material and in particular to continuous methods of producing thin, reinforced sheets of plastics which flow before setting but not after.

b. Prior Art

The class of plastic materials which includes thermosetting plastics and catalyst cured plastics are materials which readily flow before setting, but not afterwards. This class includes materials such as epoxy, melamine formaldehyde, melamine phenolic, phenolic, polybutadiene, thermosetting polyesters, thermosetting polyimide, polyurethane, silicone and urea. For convenience, this class will be termed "fluid-setting plastics" for this application.

Previously, fluid-setting plastics have been sold primarily as cast pieces. This implies high unit cost because of batch processing. Fluid setting plastics tend to have low tensile strength when cast in thin sheets. This has limited the ability of manufacturers to produce fluid-setting plastics in large thin sheets.

One approach in solving the problem of low tensile strength is to add reinforcing fibers to the material. Cast epoxy reinforced with glass or graphite fibers is a well known high strength material. Another approach is to form a laminate which reinforces the low strength fluid setting material. Many epoxy laminates are known.

An object of the invention was to devise thin reinforced fluid setting plastic sheets. Another object was to devise a method for making reinforced fluid setting plastic sheets.

SUMMARY OF THE INVENTION

The above objects have been met by the discovery that a layer of fluid-setting plastic may be supported by a layer of gelatin to form a plastic-gelatin sheet. The fluid-setting plastic may easily flow onto a moving layer of supported gelatin to form a continuous sheet of reinforced plastic where the fluid-setting plastic creates the shape and the dimensional stability after setting and the gelatin adds the desired tensile strength to the sheet and creates a substrate for a continuous sheet. It was also discovered that gelatin has the important property as a substrate for continuous sheets that if it is coated onto a film base without the use of a subbing layer to cause adherence, the gelatin may be separated from the film base by mechanical force.

First a layer of gelatin is applied to a non-bonding plastic flexible base and then a uniform coating of a fluid-setting plastic is applied over the gelatin layer. The combination of gelatin on the plastic film base resembles a photographic film. The fluid-setting plastic is then cured, forming a self-supporting reinforced plastic sheet. This combination may be separated from the non-bonded plastic base.

There are several possible alternative procedures that may be followed. For example, the gelatin could be coated with another layer of fluid-setting plastic on the opposite side, thereby sandwiching the gelatin. Another alternative involves passing the reinforced plastic sheet through water near its boiling point to remove the gelatin, leaving a thin fluid-setting plastic sheet.

An advantage of these thin sheet plastics is their long length, light weight per unit length and low cost compared to cast sheets made by batch processing.

BRIEF DESCRIPTION OF THE DRAWINGS

FIG. 2 is a plan view of a process for making an epoxy-gelatin-epoxy "sandwich" material in accord with the present invention.

FIG. 3 is a plan view of a process for making reinforced sheet epoxy in accord with the present invention.

DESCRIPTION OF THE PREFERRED EMBODIMENT

The present invention contemplates the use of gelatin as a reinforcing material for fluid-setting plastics, either as a temporary support or as a permanent support, in order to form thin stock of the desired material. Gelatin derived from cattle is a well-known material used in photography to hold photosensitive materials in photographic films and papers. Gelatin acts very much like a high polymer as described in "The Macromolecular Chemistry of Gelatin" by Arthur Veis, Academic Press, 1964, Chapter II. It has great tensile strength when dry. It also dissolves in water near 100° C.

In the discussion below, epoxy is used as an example of a fluid-setting plastic which may be reinforced and continuously produced in accord with present invention. Other fluid-setting plastics could be used, so long as they strongly adhere to gelatin when placed in contact with that material. It is believed that all fluid-setting plastics will do so.

The epoxy material discussed herein is the combination of an epoxy resin and a curing agent. Many types of epoxy resins are known and any of which may be used for purposes described herein. For general applications, epoxies which are clear or not clear may be used.

Figure 1:
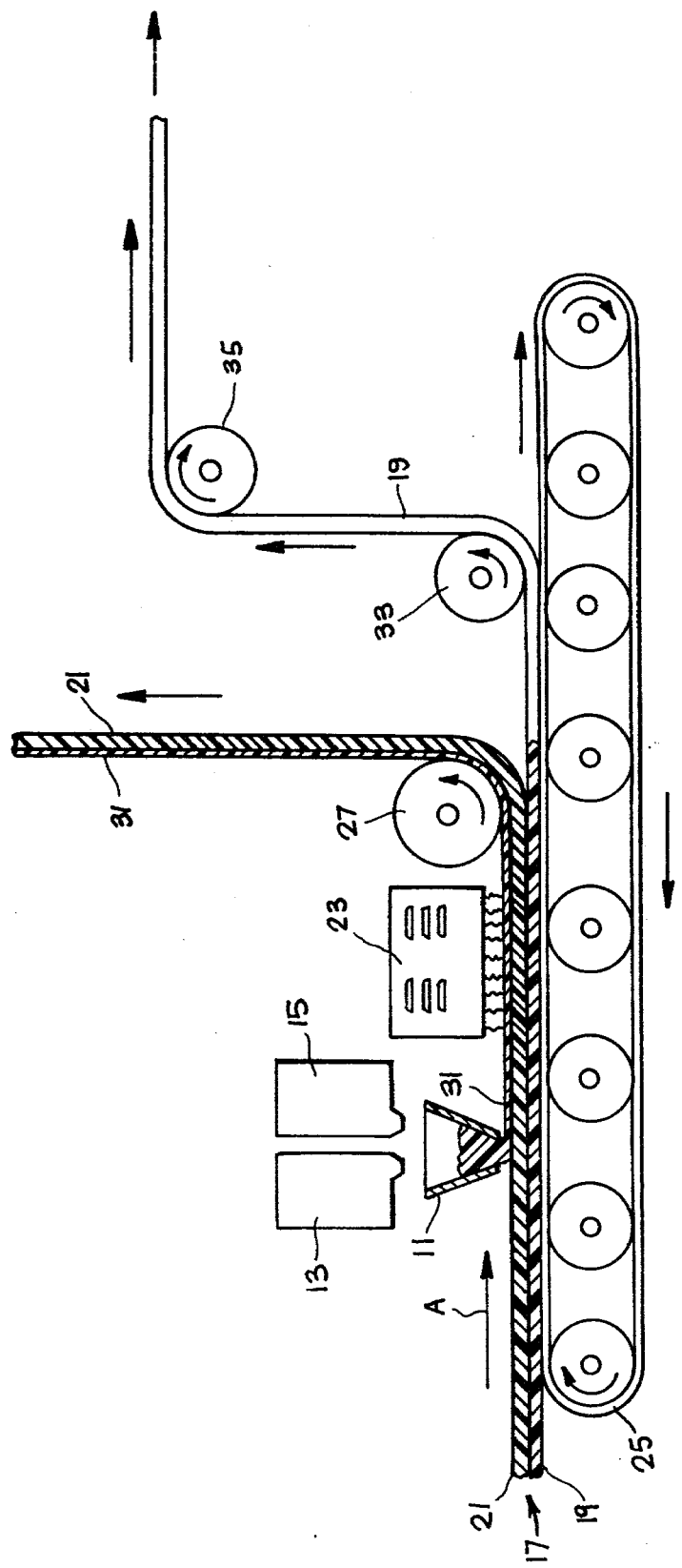
FIG. 1 is a plan view of a process for making an epoxy-gelatin layered sheet material in accord with the present invention.

In accord with the present invention, thin epoxy layers are provided with the necessary mechanical strength for forming sheets of epoxy stock material. With reference to FIG. 1, epoxy is formulated in vat 11 which receives constituent materials from supply tanks 13, 15. Supply tank 13 contains the selected epoxy resin while supply tank 15 contains the selected curing agent. The curing agent which is selected should have good stability and be easy to handle, such as an acid anhydride. Both are dispensed in appropriate chemical ratios into vat 11, wherein the two constituents are mixed by mechanical means. Vat 11 has an extrusion nozzle at its lower end for distributing a coating onto a passing substrate. Although not shown, extrusion may occur under pressure conditions.

The starting material 17 comprises a plastic base 19 with a gelatin coating 21 thereon. The plastic base 19 may be any plastic support, whether opaque or transparent, as long as the base is flexible, similar to common photographic film base materials, such as polyester, polyterephthalate, polycarbonate and cellulose triacetate, except that the base 19 need not be restricted to the common dimensions of film. To that base, a gelatin layer 21 is applied, in a conventional manner, except that no subbing layer is applied to the plastic base 19. When the gelatin is used only for reinforcement, the gelatin layer contains no photosensitive material. However, photosensitive material such as silver halide may be combined within the gelatin if a photographic film on an epoxy base is desired. In photographic film manufacture, a subbing layer is usually applied in order to adhere a gelatin emulsion layer to a film base layer. However, in the present case, separation of the gelatin emulsion from the base layer is desired, so that no subbing layer is used. Base 19 is referred to as a non-bonding base.

The gelatin layer 21 is applied in a conventional manner, in usual thicknesses characteristic of photographic films. The starting material 17 is fed beneath vat 11 where a thin coating 31 of epoxy is applied. The application is made as uniform as possible through an extrusion nozzle under positive pressure.

The extruded epoxy coating 31 immediately begins to cure, but the curing process may be aided, depending upon the curing agent, by an oven 23 which directs infrared radiation or hot air onto the epoxy coating, as the base 19 moves the material overlying it downstream of the applicator station where vat 11 is located.

Starting material 17 is continuously moved past the extrusion nozzle of vat 11 by means of a conveyor 25 which contacts plastic base 19 with sufficient friction to drive it forward beneath a fixed roller 27. Beneath roller 27, the gelatin coating 21 is pulled from plastic base 19. The gelatin coating 21 preferentially adheres to the epoxy coating 31 which is pulled at roller 27 away from the plastic film base 19. The plastic base 19 continues in the same direction as previously, around rollers 33 and 35 for subsequent cleaning and re-use. Thus, plastic base 19 may be an endless loop. On the other hand, the epoxy layer 31 has a gelatin layer 21 adhered to it, forming a plastic-gelatin sheet.

Epoxies are very useful as the plastic in this plastic gelatin sheet. They have superior adhesion and high flexural strength. The increasingly stringent requirements for flame retardancy and higher temperature resistant systems are being met by specially controlled molecular weight distribution and higher bromine content systems.

FIG. 2 shows the making of an epoxy-gelatin-epoxy "sandwich" composite sheet. Such a composite sheet material has essentially the same utility as the epoxy-gelatin sheet of FIG. 1, with the additional characteristic that the gelatin, which is absorptive of water, is now shielded on both sides by epoxy which is generally impervious to water. FIG. 2 shows the application of an epoxy coating to the composite sheet which is the product of the process of FIG. 1. In particular, the composite sheet 41 comprises an epoxy layer 31 and a gelatin layer 21. A conveyor 45 advances this starting material in the direction indicated by the arrow A toward vat 43 which receives constituent materials from supply tanks 47, 49. Supply tank 47 contains the selected epoxy resin while supply tank 49 contains the selected curing agent.

The curing agent which is selected should have good stability and be easy to handle, such as an acid anhydride. Both constituents are dispensed in appropriate chemical ratios into the vate 43, wherein the two constituents are mixed by mechanical means. Vat 43 has an extrusion nozzle at its lower end for distributing a coating onto the starting material 41. Although not shown, extrusion may occur under pressure conditions.

The extrusion is an epoxy coating 51 over the starting material 41. Immediately after extrusion, the coating begins to cure, but may be aided, depending upon the curing agent, by an oven 53 which directs infrared radiation or hot air onto the extruded coating. The finished material consists of a layer of epoxy 51 over a layer of gelatin 21 which is over a layer of epoxy 31. The thickness of the epoxy layers 31 and 51 may be the same or may be different depending upon the use for the material.

Note that in FIG. 2 the layer 51 may be the same fluid-setting plastic as layer 31 or may be a different one. FIG. 3 illustrates a method of making reinforced epoxy wherein reinforcement comes not from gelatin, because the gelatin is removed, but from internal fibers.

The starting material 17 comprises a plastic base 19 with a gelatin coating 21 thereon, just as in FIG. 1. Once again, no subbing layer is used so that film base 19 is a non-bonding base. The starting material 17 is fed beneath vat 11 which supplies epoxy constituents from supply tanks 13 and 15. Supply tank 13 contains the selected epoxy resin while supply tank 15 contains the selected curing agent. Supply tank 14 dispenses strengthening fibers, such as glass fibers so that the epoxy will be self-reinforcing. Such glass reinforced epoxy is known in the prior art. However, contrary to the prior art, such an epoxy layer can be made thinner because support is provided by the gelatin layer 21. For example, the epoxy layer 32 may be as thin as 0.5 millimeters or less, although the present method is not limited to such thin epoxy layers.

The extruded epoxy coating 32 immediately begins to cure, but curing may be aided by an oven 23 which directs infrared radiation or hot air onto the epoxy coating. Beneath roller 27 the gelatin coating 21 is separated from the plastic base 19 with the gelatin coating 21 preferentially adhering to the epoxy coating 32 which is pulled at roller 27 away from the plastic base 19 and toward roller 61. From roller 61 the composite epoxy-gelatin sheet is directed toward roller 63 in a bath 65 maintained near 100° C. which will cause removal of the gelatin from the epoxy, without effecting the stability of the epoxy. The epoxy is pulled out of the bath around roller 67, then about roller 69 and wound on a spool or otherwise stored.

The same processes described above are suitable for reinforcing other fluid-setting plastics, namely melamine formaldehyde, melamine phenolic, phenolic, polybutadiene, thermosetting polyesters, thermosetting polyimide, polyurethane, silicone and urea. In each case a sheet with improved tensile properties is produced. If the thin stock fluid-setting plastic produced as described herein has sufficient intrinsic tensile strength for a desired application the gelatin backing may be removed as described.

This application describes continuous processes for making plastic-gelatin sheet materials. It will be realized that casting methods may also be used to produce these sheets. As an example, a disk which may be used as an optical recording medium may be made as follows. A flat piece of glass is coated with a layer of gelatin without any intervening subbing layer. This intermediate product is similar to a photographic plate in appearance. Next, two concentric rings of equal height are placed on the gelatin, the height being the height of a desired epoxy layer. Next, liquid epoxy is poured into the annular region between the two rings and the epoxy is then cured. The epoxy is then peeled from the glass and the gelatin will preferentially adhere to the epoxy. The rings are left in place as part of the disk. The final product is a gelatin-epoxy disk. If the gelatin contains a photosensitive emulsion an optical medium, suitable for recording data, is formed.

Figure 4:
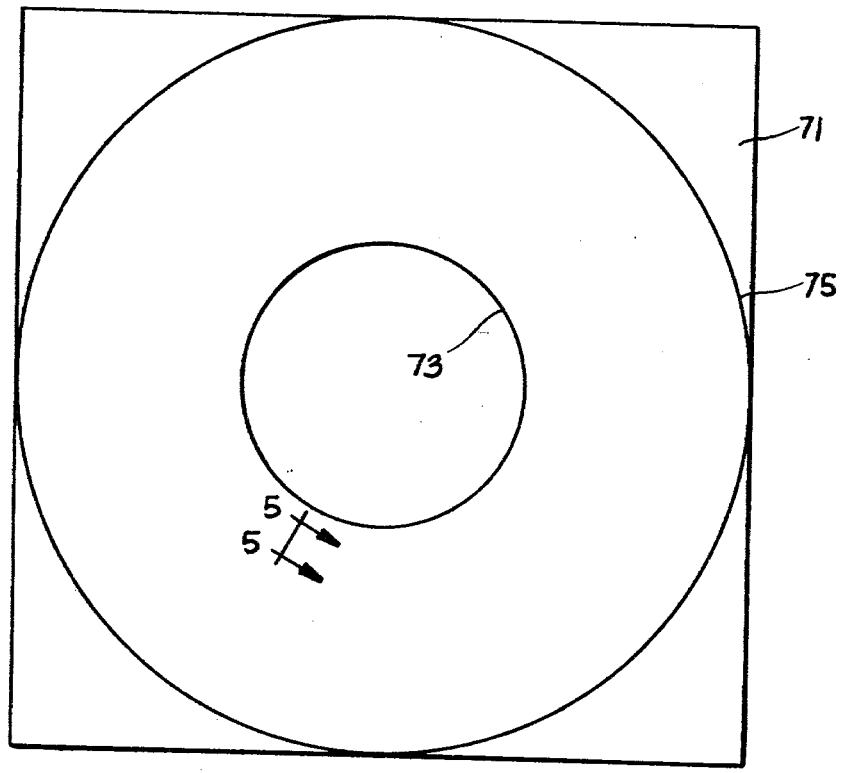
FIG. 4 is a top view of an example of an epoxy-gelatin article on a glass substrate.

The following is an example of a use for the gelatin-epoxy sheet of the present invention. With reference to FIG. 4, a square plate 71 is shown which consists of a flat piece of glass which is coated with a uniform layer of gelatin without a subbing layer. Glass is not necessary; a plastic substrate may be used. The gelatin layer is smooth and continuous and has approximately the same thickness as a gelatin layer on a photographic plate. For the purpose of making an optical recording medium, the gelatin may contain an unexposed silver-halide black and white emulsion for photographically recording data. Two concentric rings 73, 75 are placed on the gelatin. The outer ring 75 could be as large as to be tangent with edges of plate 71 or can be as small as to permit several disks to be made on the same glass substrate. The height of the rings 73, 75 corresponds to the height of an epoxy layer.

The gelatin is coated with a thin layer of fluid setting epoxy which is poured between the rings 73 and 75. After the epoxy is cured, a sharp instrument, like a razer blade, is used to cut the gelatin around the outer diameter of the outer ring 75 and around the inner diameter of the inner ring 73. Then the epoxy-gelatin sheet is peeled from the glass substrate. The glass substrate may be reused.

Depending upon the application the epoxy may be opaque or clear. When it is opaque its thickness need not be uniform and some bubbles may exist in the epoxy without detrimental effect. If the epoxy must be clear for recording or reading data through it, then it must be optically flat and devoid of bubbles in the active area of the disk. For application where the disk forms a photosensitive medium, the gelatin would typically be under eight microns thick and at least one micron thick. The epoxy coating would typically be greater than 250 microns thick and less than 2500 microns thick.

Figure 5:
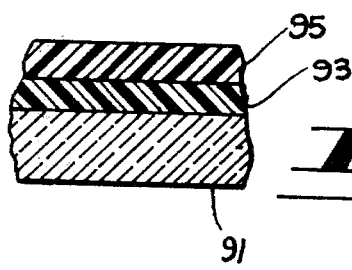
FIG. 5 is a sectional view of the article of FIG. 4 taken along lines 5—5.

FIG. 5 shows a sectional view of a portion of the disk of FIG. 4 with a glass substrate 91 supporting the sheet. The laminate consists of the gelatin layer 93 and the epoxy layer 95 on top of it.

Figure 6:
FIG. 6 shows an epoxy-gelatin article, derived from the article shown in FIG. 5, after removal of a glass substrate.

In FIG. 6, the sheet of FIG. 5 is shown to have been separated from the glass substrate. What remains is the epoxy layer 95 adhering to the gelatin layer 93. The finished disk is gelatin epoxy sheet which has good dimensional stability required for use as a data recording medium.

What is claimed is:

1. A gelatin-epoxy sheet material comprising,
a uniformly thick layer of gelatin having on a first side a directly contacting, bonding, uniformly thick layer of fluid-setting epoxy plastic.

2. The sheet of claim 1 further comprising a second directly contacting, bonding, uniformly thick layer of epoxy plastic on a second side of said gelatin opposite said first side.

3. The sheet of claim 1 wherein said gelatin layer contains a photosensitive silver-halide emulsion.

4. The sheet of claim 3 wherein said sheet has an annular disk shape.

5. The sheet of claim 1 wherein said gelatin layer is less than 8 microns thick and said epoxy plastic layer has a thickness in the range of 250–2500 microns.

* * * * *